United States Patent [19]

Cawley et al.

[11] Patent Number: 5,388,913

[45] Date of Patent: Feb. 14, 1995

[54] LINEAR BEARING COMPENSATION SYSTEM

[75] Inventors: Clifton M. Cawley, Nederland; Wesley D. Cawley, Port Neches, both of Tex.

[73] Assignee: Ohmstede-Cawley, Ltd., Beaumont, Tex.

[21] Appl. No.: 44,651

[22] Filed: Apr. 8, 1993

[51] Int. Cl.$^6$ .................... F16C 23/04; F16C 17/00; F16C 19/00
[52] U.S. Cl. .......................... 384/38; 384/7; 384/57
[58] Field of Search .................. 384/7, 38, 43, 44, 45, 384/57

[56] References Cited

U.S. PATENT DOCUMENTS

| | | | |
|---|---|---|---|
| 1,805,992 | 5/1931 | Michell . | |
| 3,190,703 | 6/1965 | Thomson et al. | 384/44 |
| 3,290,949 | 12/1966 | Samet | 74/5 |
| 4,040,679 | 8/1977 | Teramachi | 308/6 |
| 4,264,112 | 4/1981 | Magnuson | 308/3 |
| 4,527,840 | 7/1985 | Mugglestone et al. | 308/3 |
| 4,637,738 | 1/1987 | Barkley | 308/3 |
| 4,995,734 | 2/1991 | Schroeder | 384/38 |
| 5,158,372 | 10/1992 | Ueki | 384/45 |
| 5,211,279 | 5/1993 | Abbestam et al. | 384/57 |
| 5,694,549 | 3/1992 | Lyon | 384/44 |

FOREIGN PATENT DOCUMENTS

| | | | |
|---|---|---|---|
| 1385567 | 12/1964 | France | 384/7 |
| 773122 | 4/1957 | United Kingdom | 384/7 |
| 781848 | 8/1957 | United Kingdom | 384/38 |

OTHER PUBLICATIONS

Com +MCOM Series Spherical Bearings (TFE Liners Available) table, published by Aurora Bearing Company, Aurora, p. 22.

RBC Heavy Duty Single Fracture Self-Aligning Bushing Assemblies table, p. 12 (1 page).

Star Linear Systems Super Linear Bearings H and SH and Linear Sets (Lightweight Series) catalog, Copyright © Star Linear Systems 1991, pp. 1–13 (13 pages total).

Star Linear Systems Lightweight Series incorporating Star Super Linear Bearings, Copyright © Star Linear Systems 1991, cover and pp. 3–14, 27–31 (19 pages total).

Mannesmann Rexroth Star Linear Systems, Ball Rail © Systems, Copyright ©Star Linear Systems 1992, cover pages and pp. 2.0.7–2.0.21, 2.1.1–2.1.10 (27 pages total).

*Primary Examiner*—Clifford D. Crowder
*Assistant Examiner*—Bibhu Mohanty
*Attorney, Agent, or Firm*—Pravel, Hewitt, Kimball & Krieger

[57] ABSTRACT

An alignment compensation system for use with parallel linear bearings which isolates the linear motion system load or carriage plate from alignment errors in the system. Spherical bearings are mounted in bearing blocks, each spherical bearing having a support shaft therethrough to support a plate connected to a carriage or load plate. One of the bearings shafts is free to laterally float within its bearing block, thus providing for compensation of lateral misalignment of the linear bearing track. The other spherical bearing is held fixed within its bearing block. The linear system load or carriage plate is mounted on the spherical bearing shafts, thus isolating the carriage plate from alignment errors in the linear motion system.

2 Claims, 3 Drawing Sheets

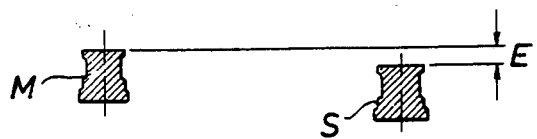
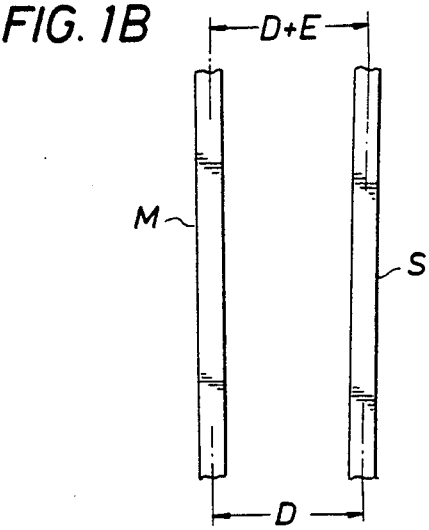
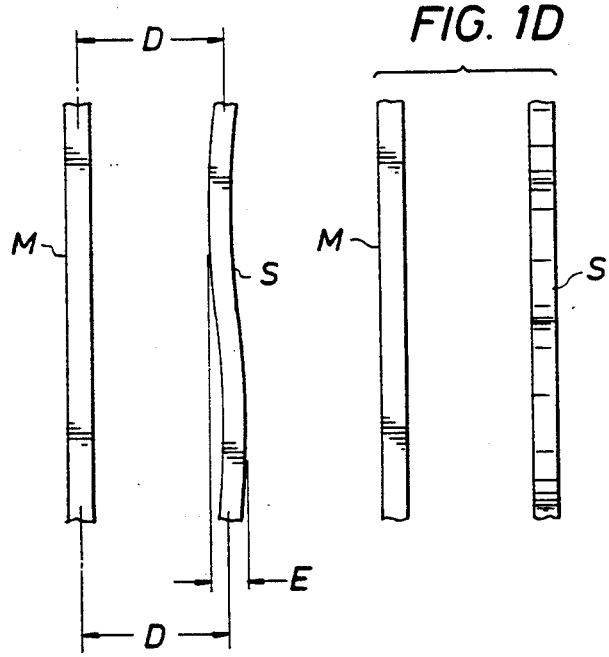
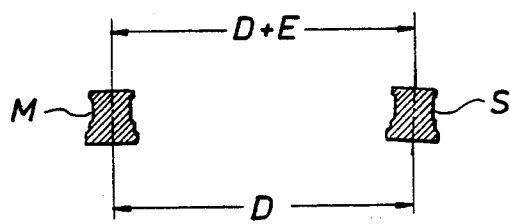

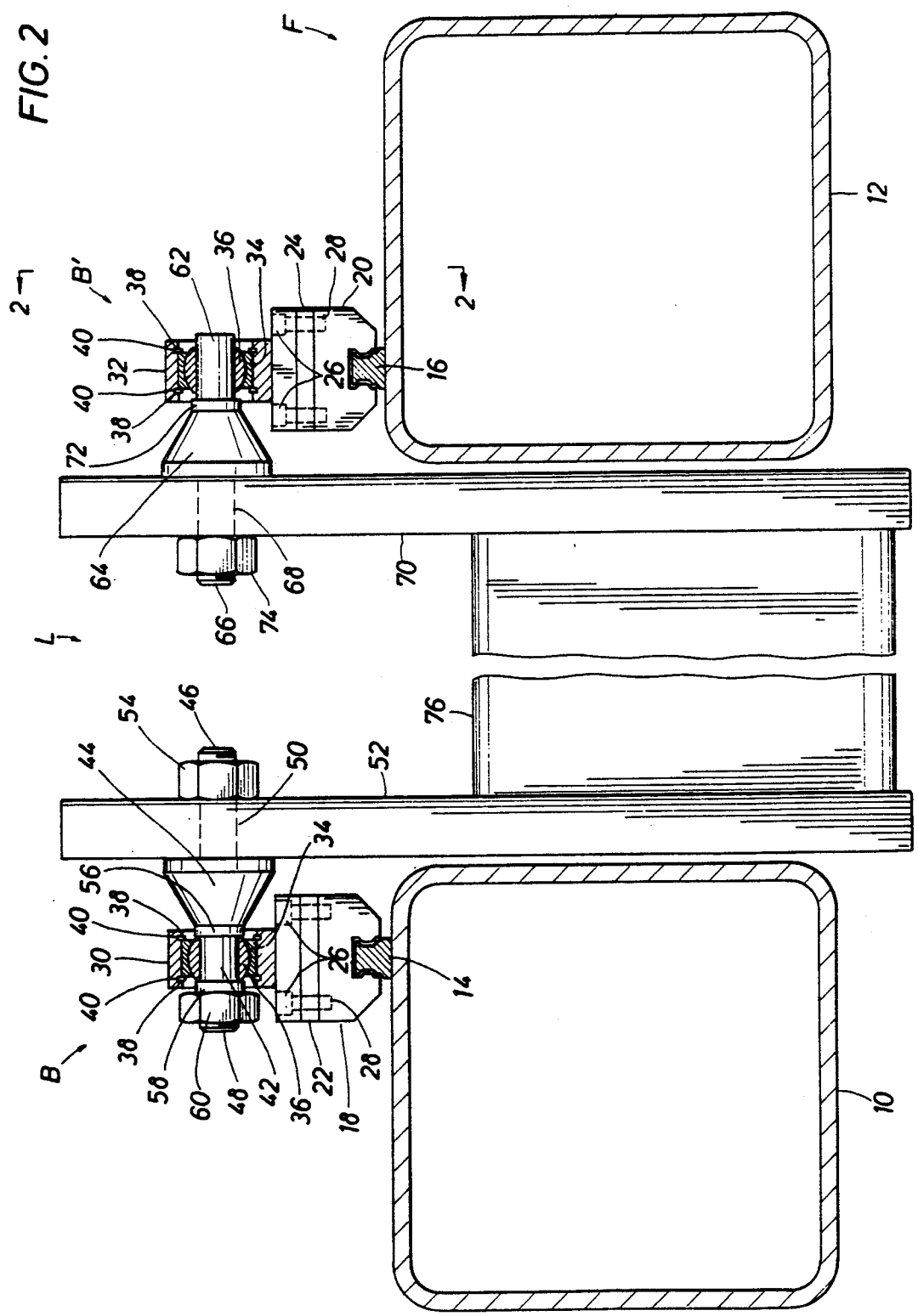

LINEAR BEARING COMPENSATION SYSTEM

BACKGROUND OF THE INVENTION

1. Field of the Invention

The present invention relates to a linear bearing compensation system, more particularly to a linear bearing compensator utilizing spherical bearings to isolate a load or carriage plate from alignment errors between parallel sets of linear motion bearings.

2. State of the Related Art

Linear bearing systems are well known in the mechanical art and are used wherever there is a need to minimize friction between two surfaces along a linear path. A linear bearing system is typically comprised of a track or rail member and a slider block mounted on and retained about the track or rail. See, for example, U.S. Pat. Nos. 5,158,372 and 4,527,840. The track member is comprised of a generally rigid, linear, precision machined metal rail having a consistent cross-section design and capable of supporting heavy loads. The slider block is generally comprised of a machined metal housing which fits over the track, means for retaining the slider block about the track, bearing means within the housing interposed between the slider block and the track, a lubrication port and a lubricant retention system. The lubrication system lubricates the bearing means and the metal to metal interfaces between the slider unit and the track, thereby decreasing the rolling friction between the slider block and the track member. The top of the slider block is often drilled and tapped to accommodate retaining means for various loads placed atop the slider block. The particular cross section of the track and slider block, as well as the bearing and lubrication means will vary from manufacturer to manufacturer.

Linear motion systems often utilize two parallel linear bearings mounted on a floor or structural framework. The parallel tracks are designated as the master and the slave tracks. The master track is utilized as a positional and dimensional reference for the slave track. A carriage plate is to be retained on two or more slider blocks with various loads adapted to fit on the carriage plate. Alternatively, a load may be mounted directly on the slider blocks themselves. A linear motion system further includes a positioning means to index the slider blocks and/or carriage plate along the tracks. The positioning means includes a drive means, such as a machine screw system, chain system, direct drive rack and pinion system or various other known drive means. The positioning means further includes a positioning verification system which assures that the slider blocks and load are positioned at the desired location on the track.

The linear bearing tracks and slider blocks are machined to a relatively tight tolerances. However, the parallel tracks are often mounted on a floor or within a structural framework which is not constructed or manufactured to the same degree of precision. The cost of manufacturing a precision surface on which to mount the tracks may be justified in some instances, such as precision machine tools, but is often not cost justifiable in other system. For example, material handling systems are often mounted on overhead gantries or directly on a cement floors. It would be impractical, and not cost justifiable to construct a gantry support system for the rails having the required precision positioning and dimensional stability, or constructing a concrete floor that is flat, level and has the necessary smoothness to match that of the rail itself.

FIGS. 1A–1F illustrate the various types of alignment errors which may be introduced into a linear motion system as the result of mounting errors. FIG. 1A is a cross sectional view of a master track M and a slave track S, in which the slave track S is not mounted at the same height or level as the master track M. It will be appreciated that the non-level tracks will introduce an alignment error E into the linear motion system. This alignment error will result in additional mechanical forces being introduced into the system. Further, it may result in positioning errors.

A second type of alignment error is illustrated in FIG. 1B. In FIG. 1B, the slave track S is not mounted parallel to the master track M. The master M and slave S tracks are mounted a nominal distance D apart and the non-parallel condition introduces an error E such that the master M and slave S tracks are a distance D+E apart further down the tracks. Movement along the tracks by slider units and the carriage plate will introduce angular errors and external mechanical forces into the linear motion system.

A third type of alignment error is illustrated in FIG. 1C. In FIG. 1C, the ends of slave track S are shown as being spaced a consistent distance D from the master track M. However, the slave track S is mounted in a non-linear fashion relative to master track M, introducing a lateral error E in the track. This type of alignment error may occur when the retaining holes for the slave track S are not drilled parallel to master track M, resulting in a warpage in the slave track S when it is bolted to the framework or floor. This type of error will also introduce dimensional errors into the system and additional mechanical resistance.

A fourth type of alignment error is illustrated in FIGS. 1D and 1E. In FIG. 1D, the master M and slave S tracks appear to be mounted parallel to each other. However, the same tracks are depicted in FIG. 1E, which is a side view of FIG. 1D. As may be seen in FIG. 1E, the slave track S varies in height down its length, introducing vertical error E into the system. This type of error may result from a non-level floor or framework mounting surface.

A fifth type of alignment error is illustrated in FIG. 1F. In FIG. 1F, the vertical axis of slave track S is not parallel with the master track M vertical axis. Thus, while the bottom of slave track S is the desired nominal distance D from the master track M, the top of slave track S is a distance D+error E from the master track M.

FIGS. 1A–1F are illustrative of the types of alignment errors which may occur when mounting parallel linear bearing tracks. It will be appreciated that while each type of error has been shown in isolation in FIGS. 1A–1F, combinations of these errors may occur as the tracks are secured to a framework or floor.

The prior art discloses a number of linear bearing compensators intended to overcome these various errors. These prior art devices include U.S. Pat. No. 4,995,734 to Schroeder and U.S. Pat. No. 4,637,738 to Barkley. These systems attempt to compensate for alignment errors by introducing a compensation element having a limited range of movement. However, the alignment compensators in these systems are limited in the degrees of freedom and introduce mechanical forces into the linear motion system as a result of their compensation for alignment errors. It will be appreciated that the introduction of external mechanical forces to the linear motion system will result in additional wear on the bearing systems and the linear drive system.

Thus, there exists a need for a low cost linear bearing compensator which permits a high degree of freedom without introducing external forces into the linear motion system.

SUMMARY OF THE INVENTION

The present invention relates to a linear bearing compensation system capable of providing alignment compensation movement without introducing external forces into the linear motion system. The compensation system calls for mounting spherical bearings in bearing blocks on the master and slave linear bearing slider blocks. A master and slave support shafts are inserted into the spherical bearings and support a master and a slave support plate, which in turn support a carriage or load plate. This isolates the carriage plate or load from the alignment errors in the master and slave tracks. The master support shaft is laterally fixed within its spherical bearing but is otherwise capable of angular movement. The slave support shaft is not laterally fixed within its bearing and is capable of lateral, as well as angular, movement. Thus, the compensation system of the present invention provides for a low cost method for isolating a load within a linear motion system from track alignment errors without introducing external mechanical forces into the system.

BRIEF DESCRIPTION OF THE DRAWINGS

A better understanding of the invention can be obtained when the following detailed description of exemplary embodiments is considered in conjunction with the following drawings, in which:

FIGS. 1A-1F are examples of track alignment errors which may occur in linear motion systems;

FIG. 2 is an end view of a linear motion system utilizing a preferred embodiment of the compensation system;

DETAILED DESCRIPTION OF THE PREFERRED EMBODIMENT

Figure 3:
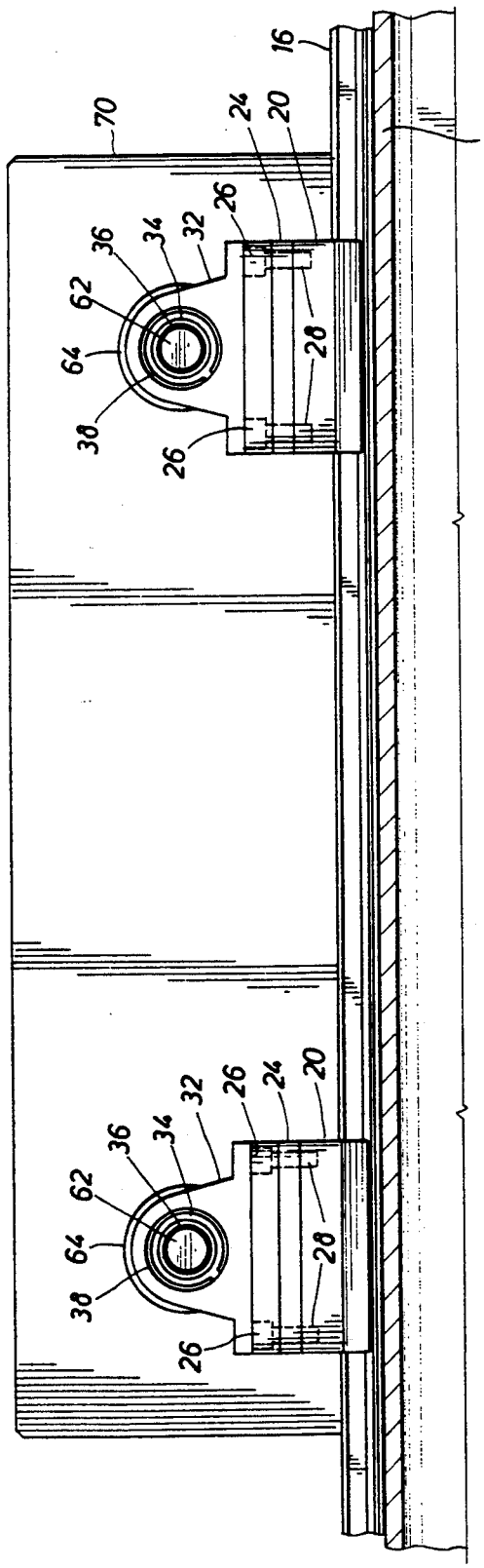
FIG. 3 is a side view of the preferred embodiment illustrated in FIG. 2 taken through section 3—3.

FIG. 2 is an end view of a linear motion system utilizing the preferred embodiment of the compensation system. For the purposes of this discussion, the linear motion system of FIG. 2 is illustrated without a positioning means, including drive and positioning verification means. However, one of ordinary skill in the art would have knowledge as to how a positioning means could be readily adapted to the linear motion system of FIG. 2.

The linear motion system L is shown as being mounted on a structural framework F. It will be appreciated that the linear motion system L may also be mounted on other types of structural frameworks or a floor within the preferred embodiment illustrated in FIG. 2. The structural framework F of FIG. 2 is comprised of two square cross sectional structural beams 10 and 12. It will be appreciated that other structural cross sections, such as I beams, could be utilized within structural framework F. The beams 10 and 12 are generally rigid but provide imperfect mounting surfaces for the linear motion system L.

The linear motion system L is comprised of a master track 14 mounted on a structural beam 10. The master track 14 is typically affixed to the structural beam 10 by means of recessed mounting holes in master track 14 (not shown) having bolts (not shown) inserted therein and secured to the structural beam 10 by means of drilled and tapped holes in beam 10 or nuts. It will be appreciated that other means for securing the master track 14 to the structural beam 10, such as clamps or welds are contemplated within the scope of the preferred embodiment. A slave track 16 is mounted on a structural beam 12 parallel to the master track 14. The slave track 16 may be affixed to the structural beam 12 utilizing recessed holes within track 16, bolts inserted therein and secured to the structural beam 12 by means of drilled and tapped holes or nuts (not shown). The master 18 and slave 20 linear slider blocks are shown as being mounted on and retained about the master 14 and slave 16 tracks, respectively. The particular design of the tracks 14 and 16 and the slider blocks 18 and 20 will vary with the manufacturer of the linear bearings. It will be appreciated that these various designs may be utilized with the compensation system of the preferred embodiment.

Spherical bearing blocks 22 and 24 are mounted on the master 18 and slave 20 sliders, respectively. The bearing blocks 22 and 24 are typically retained by means of bolts 26 inserted into recessed bolt holes in bearing blocks 22 and 24 and threaded into drilled and tapped holes 28 in the master 18 and slave 20 slider blocks. It will be appreciated that other known means of securing bearing blocks 22 and 24 to slider blocks 18 and 20 are contemplated within the preferred embodiment. The spherical bearing blocks 22 and 24 further include bearing housings 30 and 32, respectively. The bearing housings 30 and 32 are designed to support and retain spherical bearings B and B' respectively The design and use of spherical bearings B and B' are readily known to one of ordinary skill in the art. Typical commercial spherical bearings provide for rotational angular misalignment on the order of ±8°-14°. The construction of the spherical bearings B and B' utilized within the preferred embodiment are similar. Accordingly, the following discussion relating to the construction of the spherical bearing applies to bearings B and B'. The spherical bearings B and B' are comprised of an outer race 34 having a cylindrical outer surface and a spherical race surface and an inner race 36, having a spherical outer surface and a bearing way therethrough, adapted to fit within the outer race 34. The spherical bearings B and B' are retained within the bearing housings 30 and 32 by means of snap rings 38 which are inserted into snap ring grooves 40 in bearing housings 30 and 32. Other suitable methods for retaining spherical bearings B and B' within bearing housings 30 and 32, such as retaining screws, may be utilized within the preferred embodiment.

A master support shaft is inserted through the inner race 36 bearing way of bearing B. The master support shaft is comprised of a support shaft section 42, a flared contact section 44, a first threaded portion 46 and a second threaded portion 48. The first threaded portion 46 of the master support shaft is adapted to fit through a hole 50 in the master support beam 52, bringing the master support shaft contact section 44 into abutment with the master support beam 52. The master support beam 52 is secured to the threaded portion 46 by means of a bolt 54. The contact section 44 of the master support shaft further includes a support shoulder 56, which is in contact with the inner race 36 of spherical bearing B. The support shaft section 42 is further retained within the bearing housing 30 by a washer 58 which fits over the support shaft section 42 and is in abutment with the inner race 36 of spherical bearing B and a nut 60, which is secured to the second threaded portion 48 of the master support shaft. Thus, the master support plate 52 is supported by a cantilevered master support shaft which is, in turn, supported by the spherical bearing B. The shoulder 56 of the support section 42 and the washer 58 laterally capture and hold the master support shaft within the spherical bearing B. The compensation system for the master slider 18 provides for a laterally fixed master support plate 52, while providing for angular alignment compensation by means of the spherical bearing B.

A slave support shaft is likewise inserted in the inner race 36 bearing way of the slave spherical bearing B'. The slave support shaft is comprised of a support section 62, a flared contact section 64 and a threaded section 66. The threaded section 66 is adapted to pass through a hole 68 in slave support plate 70. The contact portion 64 of the slave support shaft further includes an inner shoulder 72 not in abutment with slave spherical bearing S'. The threaded portion 66 of the slave support shaft is secured to the slave plate 70 by means of a nut 74. A carriage plate 76 is illustrated as being interposed between and supported by the master plate 52 and the slave plate 70. It will be appreciated that the carriage plate 76 may be connected to master plate 52 and slave plate 70 by means of nuts and bolts, bolts inserted into drilled and tapped holes, welding or any other suitable means. The support section 62, and therefore slave plate 66, are free to float laterally within spherical bearing B' thus providing for lateral compensation without introducing external forces into the linear motion system. The combination of the laterally fixed master support shaft and the laterally floating slave support shaft, together with the angular compensation provided by spherical bearings B and B', provide the preferred embodiment with the ability to compensate for the types of errors illustrated in FIGS. 1A–1F without introducing external mechanical forces into the linear motion system.

FIG. 3 is a side view of the preferred embodiment of FIG. 2 as seen through section 3—3. The slave track 16 is shown as mounted on the support beam 12. FIG. 3 illustrates two slider blocks 20 mounted on slave track 16. Each slider block 20 includes a slave bearing housing 24 which is secured to the slave slider block 20 by means of bolts 26 inserted into recessed holes in slider blocks 20 and threaded into drilled and tapped holes 28 in slider blocks 20. The slave support shaft support sections 62 are shown as being supported within the bearing housings 32 by the spherical bearing B ∝ inner race 36 and the outer race 34. The spherical bearings B ∝ is shown as being retained within the bearing housings 32 by means of snap rings 38. The slave support shaft contact sections 64 are seen abutting slave support plate 70.

Figure 4:
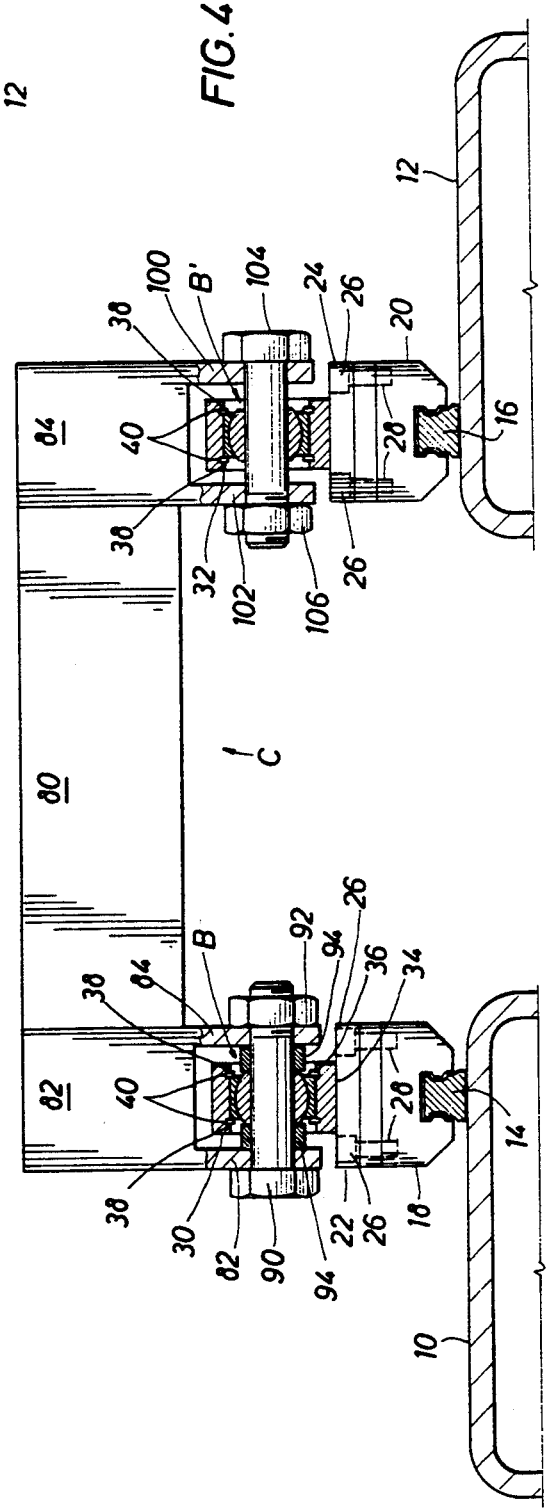
FIG. 4 is an end view of an alternate embodiment of the compensation system.

The means for providing compensation movement in FIGS. 2 and 3 is achieved through cantilevered support shaft sections 42 and 62 which are secured within the spherical bearings B and B'. It will be appreciated that alternate means for providing compensation movement may be achieved. FIG. 4 is an alternate embodiment in which a yoke support design is utilized to provide for alignment error compensation. As with the embodiment of FIG. 2, FIG. 4 is illustrated without a drive or positioning verification means. The alternate embodiment of FIG. 4 is comprised of a master track 14 mounted on a support beam 10. As before, the master track 14 may be secured to the support beam 10 by means of recessed bolts (not shown) secured to the support beam 10 by means of drilled and tapped holes or nuts (not shown). It will be appreciated that other known means for securing the master track 14 to support beam 10 may be used within the claimed invention.

A slave track 16 is mounted on a support beam 12 by means of drilled and tapped holes or nuts utilizing recessed bolts passing through the slave track 16 and secured to the support beam 12 (not shown). As with the master track 14, alternate means of mechanically securing the slave track 16 to the support beam 12 are contemplated within the scope of the preferred embodiment. The embodiment of FIG. 4 further includes a master slider block 18 mounted on and secured about master track 14 and a slave slider block 20 mounted on and secured about slave track 16. The master 22 and a slave 24 bearing blocks are mounted and secured to the master slider block 18 and the slave slider block 20, respectively. As in FIG. 2, the master bearing block 22 and the slave bearing block 24 are secured to their respective slider blocks, 18 and 20, by means of bolts 26 inserted into recessed holes and threaded into drilled and tapped holes 28 in the slider blocks 18 and 20. As in the preferred embodiment of FIG. 2, alternate means of securing bearing blocks 22 and 24 to slider units 18 and 20 are contemplated within the illustrated embodiment. The bearing blocks 22 and 24 further include bearing housings 30 and 32 to support and retain spherical bearings B and B'. As in the preferred embodiment of FIG. 2, the construction of bearings B and B' is similar. The spherical bearings B and B' are comprised of an outer bearing race 34, having a cylindrical outer surface and a spherical race surface and an inner bearing race 36, having a spherical outer surface and a bearing way therethrough. The spherical bearings B and B' are retained within the bearing housings 30 and 32 by means of snap rings 38 which are inserted into snap ring grooves 40 in the bearing housings 30 and 32.

The alternate embodiment of FIG. 4 utilizes a yoke system for its support plates. The carriage C is comprised of a carriage plate 80 and a master 82 and slave 84 support plate. The master support plate 82 further includes two yoke support extensions 86 and 88 which permit the master support plate 82 to be positioned over and about master spherical bearing housing 30. The master support plate 82 is supported by the master spherical bearing B by means of a bolt 90 passing through support extensions 86 and 88 and through the bearing way of inner race 36 of spherical bearing B. The bolt 90 further passes through support washers 94, which are in abutment with the inner faces of yoke extensions 86 and 88 and the spherical bearing B inner race 36. The bolt 90 is secured to the master support plate by means of a nut 92. Thus, the spherical bearing B provides for angular compensation movement by master support plate 82 while holding master support plate 82 laterally fixed.

The slave support plate 84 includes yoke extensions 100 and 102 which fit over and about the slave bearing housing 32. The slave support plate 84 is supported by slave bearing B' and a bolt 104 which passes through the inner race 36 of slave spherical bearing B' and slave support plate 84 extensions 100 and 102. The bolt 104 is secured to the slave support plate 84 by means of a nut 106. It will be appreciated that the slave support plate 84 is not laterally fixed with respect to slave support bearing housing 32, as achieved in the master support plate 82 by means of washers 94. Thus, the bolt 104 shaft may move laterally as well as angularly within spherical bearing B'. The slave support bearing B' provides for lateral compensation without introducing any external mechanical forces as a result of compensating for any alignment errors.

Thus, the claimed invention provides for a low cost linear bearing compensation means to overcome alignment errors. While the preferred embodiments show the slave and master support rails mounted on beams and a mechanical framework, it will be appreciated that the claimed invention may be used where said rails are mounted on a surface such as a floor.

Having described the invention above, various modifications of the techniques, procedures, material and equipment will be apparent to those in the art. It is intended that all such variations within the scope and spirit of the appended claims be embraced thereby.

What is claimed is:

1. A linear compensation system for use with a parallel track linear motion system, the linear motion system comprised of a first track member having at least one slider member mounted thereon and a parallel second track member having at least one slider member mounted thereon, comprising:
   a carriage;
   at least one first support for providing angular compensation, said first support mounted and retained on the first track member slider member and having a spherical bearing for angular compensation and a support shaft laterally restrained by said spherical bearing;
   at least one second support for providing angular and lateral compensation, said second support mounted and retained on the second track member slider member and having a spherical bearing for angular compensation and a support shaft inserted within said second support spherical bearing and capable of lateral movement within said second support spherical bearing; and
   means for connecting said first and second supports to said carriage.

2. An alignment compensation system for use with a linear motion system, the linear motion system including parallel first and second linear support members, each support member having at least one sliding member mounted and retained thereon, said alignment compensation system comprising:
   a carriage;
   a first support for angular compensation mounted on said first linear support member, said first support having a spherical bearing for angular compensation and a support shaft laterally restrained by said spherical bearing;
   a second support for providing angular and lateral compensation mounted on said second linear support, said second support having a spherical bearing for angular compensation and a support shaft inserted within said second support spherical bearing and capable of lateral movement within said second support spherical bearing; and
   means for connecting said first and second supports to said carriage.

* * * * *

UNITED STATES PATENT AND TRADEMARK OFFICE
CERTIFICATE OF CORRECTION

PATENT NO. : 5,388,913
DATED : February 14, 1995
INVENTOR(S) : Clifton M. Cawley and Wesley D. Cawley It is certified that error appears in the above-identified patent and that said Letters Patent is hereby corrected as shown below:

Column 5, lines 56 and 58, please change "B∝" to --B'--.

Signed and Sealed this

Eighteenth Day of April, 1995

Attest:

BRUCE LEHMAN

Attesting Officer

Commissioner of Patents and Trademarks